United States Patent [19]
Dræbel

[11] Patent Number: 5,738,205
[45] Date of Patent: Apr. 14, 1998

[54] CONVEYOR CHAIN HAVING A SUPPORTING FACE CONSITITUTED BY CHAIN LINKS TRANSVERSAL TO THE LONGITUDINAL DIRECTION OF THE CHAIN

[76] Inventor: Jørgen Dræbel, Glasvej 8A, DK-2400 Copenhagen NV, Denmark

[21] Appl. No.: 564,113
[22] PCT Filed: Apr. 12, 1995
[86] PCT No.: PCT/DK95/00156
  § 371 Date: Dec. 15, 1995
  § 102(e) Date: Dec. 15, 1995
[87] PCT Pub. No.: WO95/28343
  PCT Pub. Date: Oct. 26, 1995

[30] Foreign Application Priority Data
Apr. 15, 1994 [DK] Denmark ................... 0440/94
Aug. 4, 1994 [DK] Denmark ................... 0908/94

[51] Int. Cl.⁶ .................................................. B65G 17/06
[52] U.S. Cl. ......................................... 198/852; 198/805
[58] Field of Search ............................... 198/805, 852

[56] References Cited

U.S. PATENT DOCUMENTS

| 2,872,023 | 2/1959 | Bechtel . | |
|---|---|---|---|
| 3,261,451 | 7/1966 | Roinestad . | |
| 3,944,059 | 3/1976 | Garvey . | |
| 4,823,939 | 4/1989 | Langhams et al. | 198/805 |
| 4,981,208 | 1/1991 | Jones | 198/805 |
| 5,031,757 | 7/1991 | Draebel et al. | 198/852 |
| 5,123,524 | 6/1992 | Lapeyre . | |
| 5,139,135 | 8/1992 | Irwin et al. . | |
| 5,197,591 | 3/1993 | Roinestad et al. | 198/852 |
| 5,247,789 | 9/1993 | Abbestam . | |

FOREIGN PATENT DOCUMENTS

| 148137 | 6/1980 | Denmark . |
|---|---|---|
| 162348 | 7/1989 | Denmark . |
| 168858 | 6/1994 | Denmark . |
| 905499 | 5/1991 | Finland . |
| 2381694 | 2/1978 | France . |
| 443138 | 1/1968 | Germany . |
| 2339644 | 2/1975 | Germany . |
| 2753778 | 6/1978 | Germany . |
| 344045 | 3/1972 | Sweden . |
| 9008080 | 7/1990 | WIPO . |

*Primary Examiner*—Joseph E. Valenza

[57] ABSTRACT

A conveyor belt comprising a load carrying top surface assembled from links extending sidewards of the width of the belt, and which incorporates eyeparts (17, 18) on the first row provided with holes in sidewards alignment for the connection rods (23), and where the holes at the eyeparts at second row have been extended as slots, in which the connection rods (23) are movable in the direction towards first rows eyeparts and where the eyeparts at first row are tied to the eyeparts at second row by means of connection parts (19), and where the side links have been provided with L-shaped guide tabs, intended to guide the conveyor belt in horizontal and in vertical direction and to retain the conveyor belt at the supporting wear profiles. In order to allow change and replacement of the guide tabs, which wear much faster than other parts of the conveyor belt, the side links have been provided with a downwards extension, which incorporates a profiled cavity (21), through which the connection rod (23) can be inserted, and which provides space for an exchangeable guide/lock insert, which by means of a snap-fit lock system can be locked to the side link and to the connection rod (23).

13 Claims, 12 Drawing Sheets

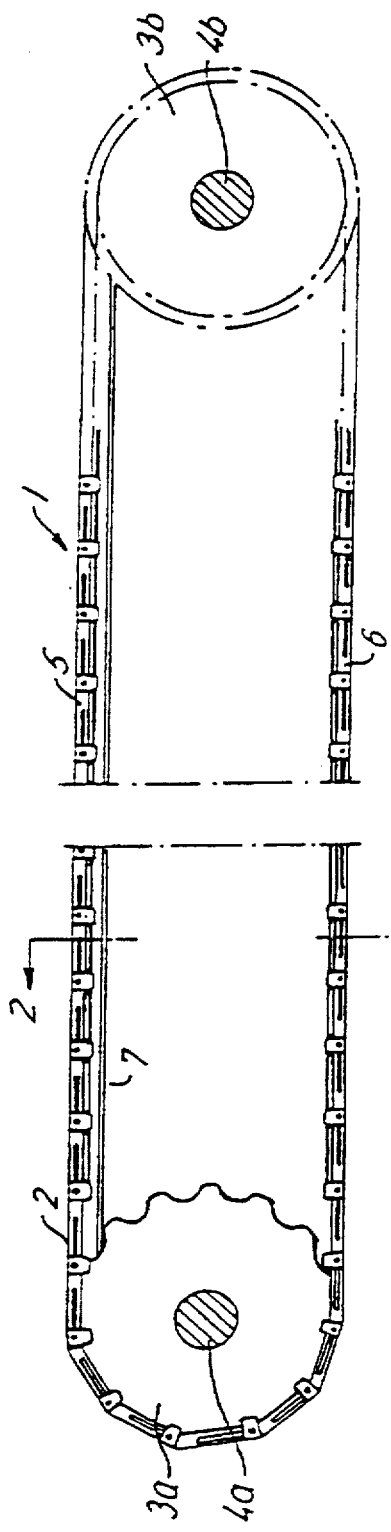
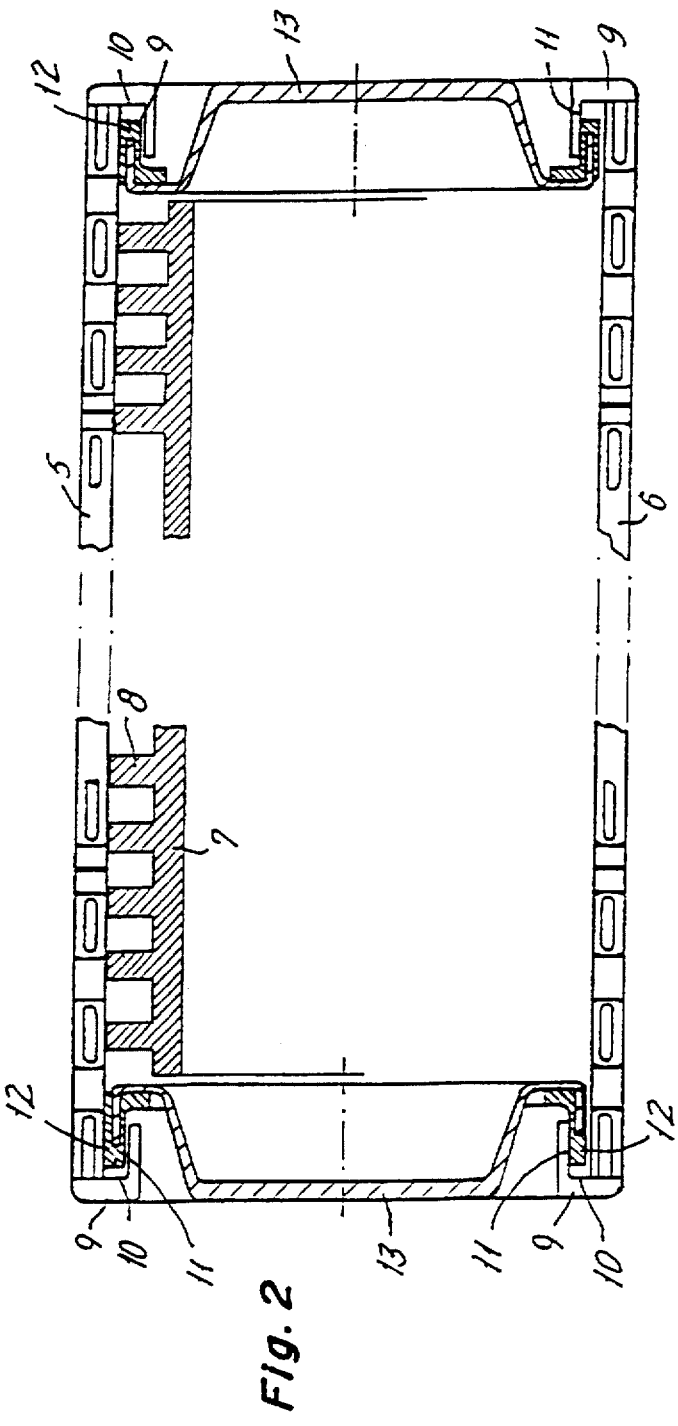
Fig. 1
Fig. 2

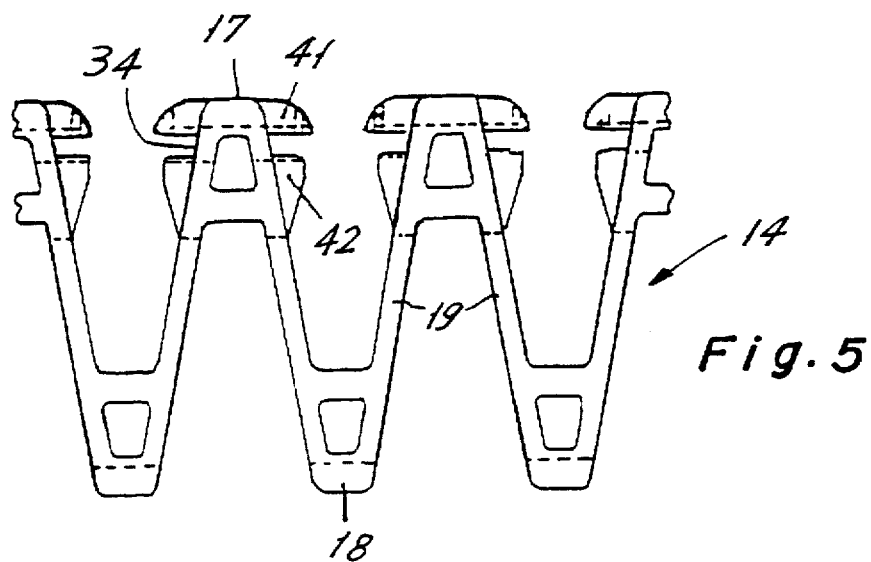
Fig. 5
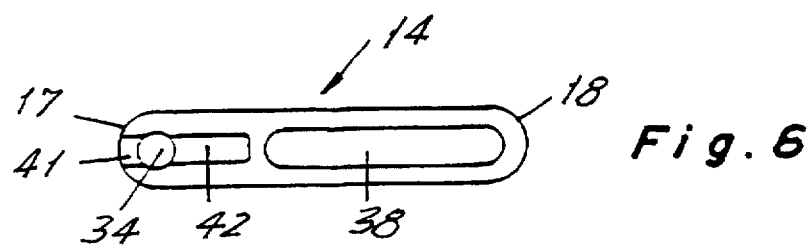
Fig. 6
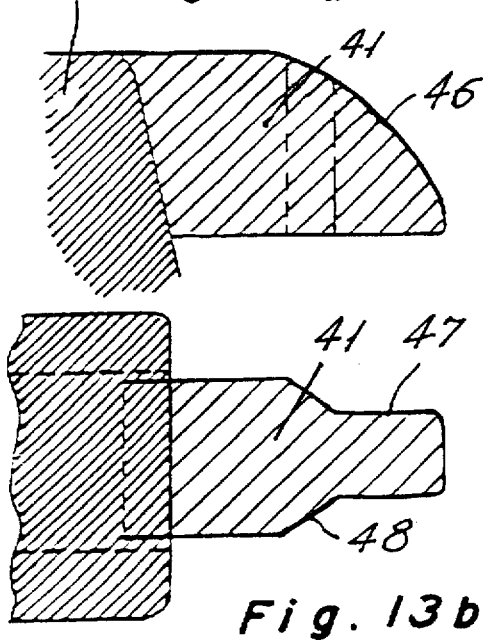
Fig. 13a
Fig. 13b
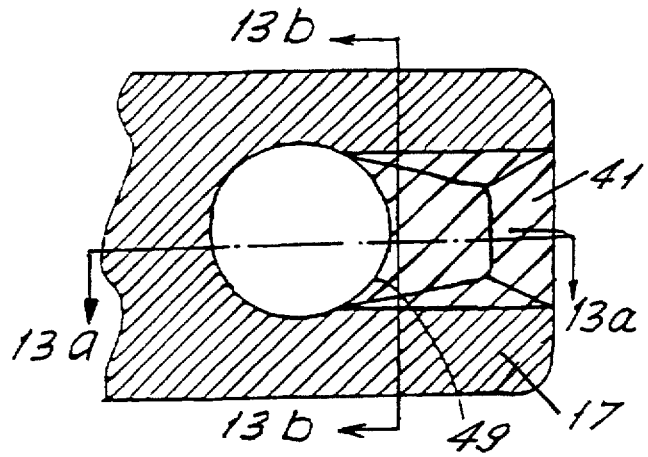
Fig. 13c

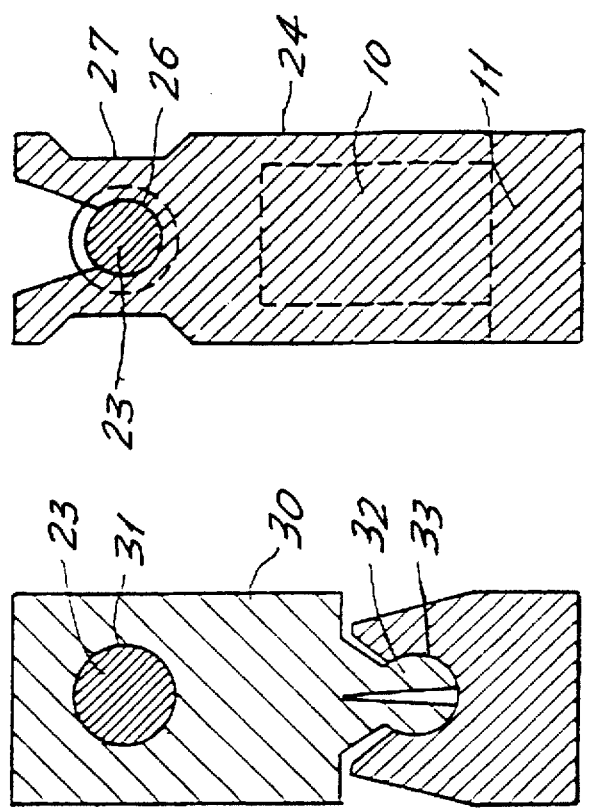
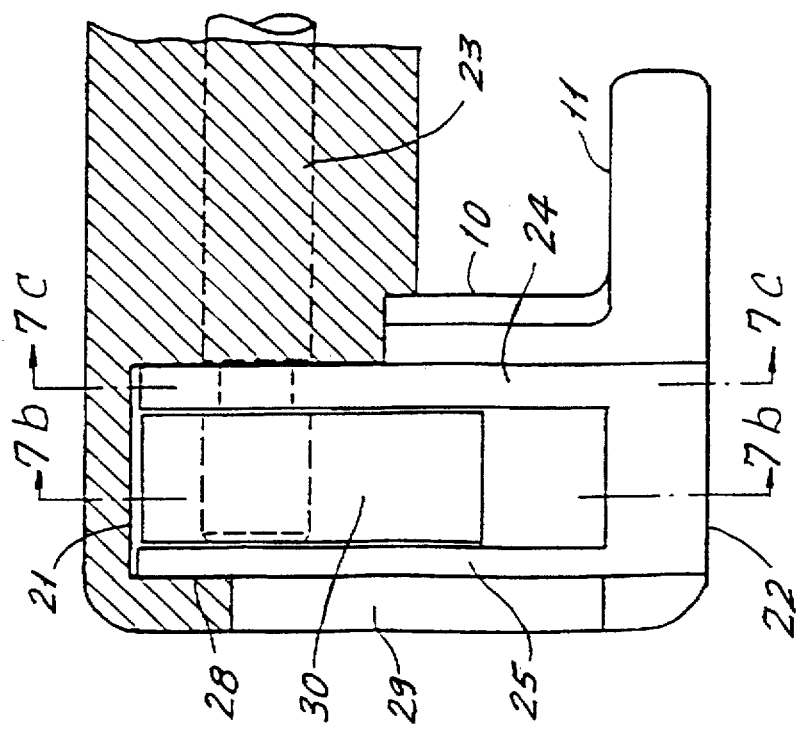
Fig. 7c
Fig. 7b
Fig. 7a

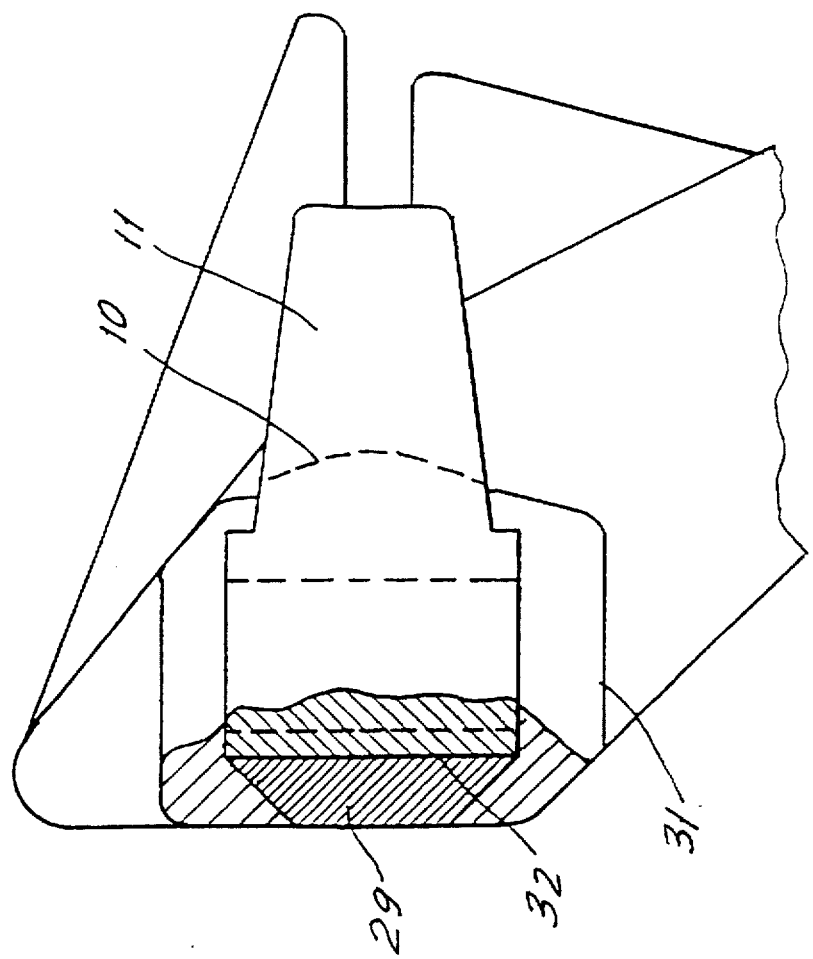

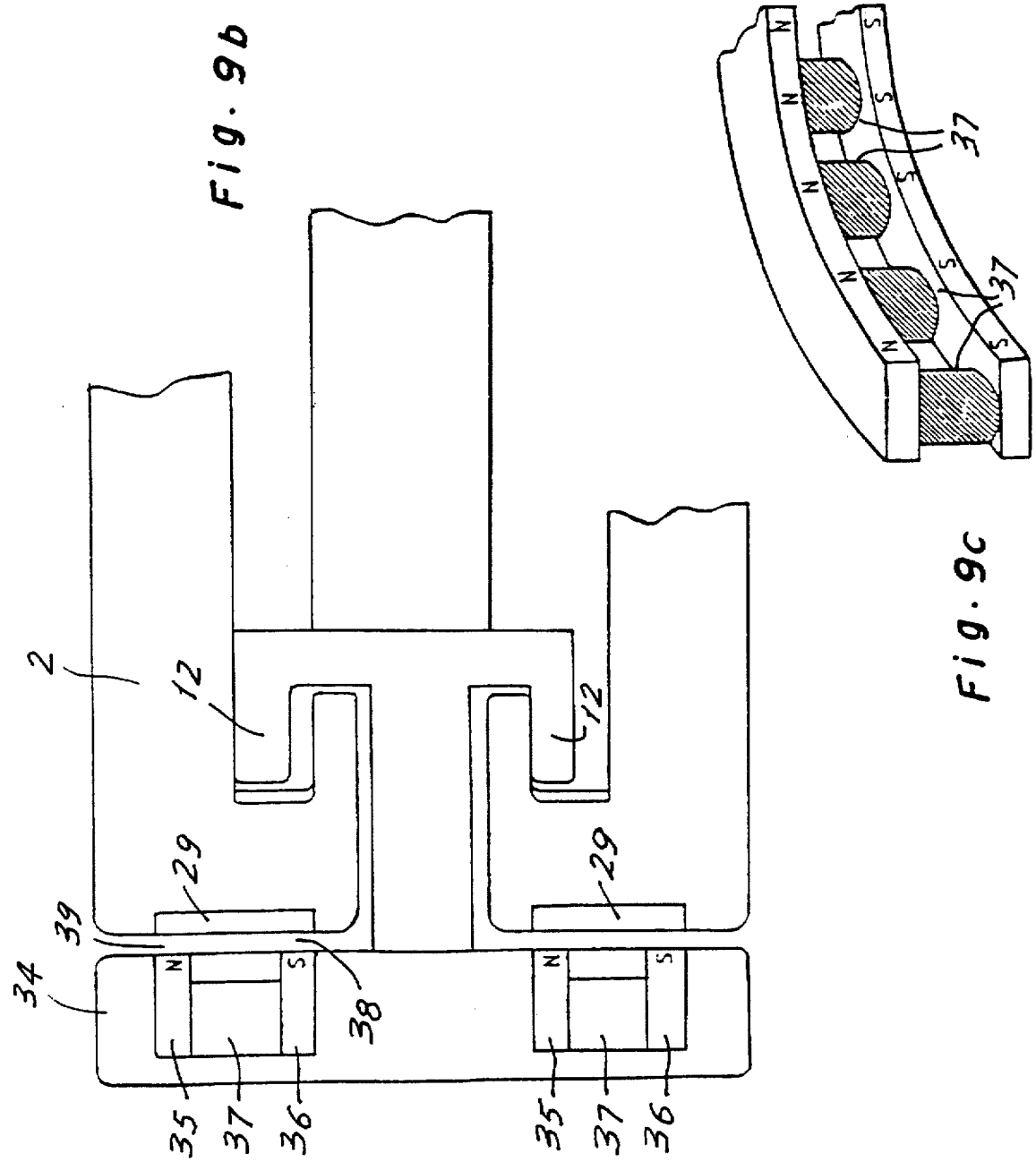

CONVEYOR CHAIN HAVING A SUPPORTING FACE CONSTITUTED BY CHAIN LINKS TRANSVERSAL TO THE LONGITUDINAL DIRECTION OF THE CHAIN

The invention concerns a conveyor belt, comprising links, which form a load-carrying top surface, and which extend crosswise in a zig-zag pattern across the belt width, and which include a first row and a second row of eyeparts, and connection parts, which at an angle relative to the conveying direction tie eyeparts at the first row to eyeparts at the second row, and where the eyeparts are provided with holes for the connection rods, and where the holes at the second row of eyeparts have been extended as slots, in which the connection rods can move freely in the direction of the eyeparts at the first row, and where the side links incorporate L-shaped guide/lock tabs for horizontal and vertical guidance of the conveyor belt, and where the L-shaped guide tabs also are intended to retain the conveyor belt properly in the conveyor track.

Conveyor belts of this kind are known and for example described in Danish patent 162.348. In installations in which the conveyor belt passes a number of bends or curved, the L-shaped guide tabs, which are integral parts of the side links, are exposed to sever friction forces and are consequently exposed to considerable wear, when the tabs are in sliding contact with the supporting members. The wear occurring at the guide tab is, due to the narrow contact area towards the supporting member, and through which the lateral forces are transferred, in praxis considerably higher, than the wear occurring at other loadcarrying parts of the conveyor belt. Consequently, the service life of the L-shaped guide tabs is significantly reduced relative to other sections of the belt. The necessary change and replacement of side links with worn out guide tabs is a time-consuming and tedious process, which can be performed only by disassembly of the conveyor belt, which results in a prolonged stop of the conveying system.

The object of the invention is to provide a design, which allows the incorporation of exchangeable guide tabs, and where the change and replacement can be performed without taking apart the conveyor belt, and by which the duration of the stop can be considerably reduced. Further, the design of the belt consider maximum protection of the ends of the connection rods and consider the need of maintenance of a high hygienic standard. The design facilitates in this regard the cleaning and avoids open slits and cavities, where dirt might accumulate.

The above object is met according to the invention with a conveyor belt, which is characterized that the side links have downwards extensions, perpendicular to the load carrying top surface of the conveyor belt, and which incorporate cavities, through which the connection rods can be inserted, and into which guide/lock inserts incorporating snap-fit parts to engage with the corresponding connection rods.

According to the invention, the guide tab is locked to the side link and to the connection rod by means of snap-fit locks, which arrangement in a safe and reliable manner locks the guide tab insert to the side link, and by which the guide tab is able to resist the considerable forces, acting on the guide tab, particularly when passing through curves. The guide tab can be removed and be replaced, without taking apart the belt. Due to the fact, that the weight of the guide part insert constitute a minor part of the belt, it is possible and economical feasible to mould the insert from a composite, which is characteristic of high resistance to wear and by low coefficient of friction during sliding contact with the wear and supporting members.

According to a preferred design the guide tab insert is locked to the side link by means of double snap-fit locks, which allow the guide tab insert to be removed and replaced by a new insert, and where the procedure can be performed without the need of special tools. According to a preferred design, the connection rod is provided with circular keyways, positioned close to the ends of the connection rod, into which the female lock parts, incorporated in the guide tab insert, can engage. The surface of the side link incorporates by this design a minimum of dirt- and liquid collecting crevices and slits.

The guide tab is exposed to severe friction and wear during curve passage and when the flow direction changes from horizontal to either inclining or declining flow. For this reason a reliable lock system is necessary in order to safely retain the guide tab insert into the cavity at the side link. A double snap-fit lock system, where the connecting rods are inserted through holes incorporated in the male snap-fit part at the link side and the male part engages a female snap-fit lock part incorporated in the guides/lock insert, has been incorporated specifically for this purpose.

According to an aspect according to the invention, the exchangeable insert design allows incorporation of a ferro-magnetic member in connection with the side link, by means of which the member, which able to conduct magnetic forces, can serve as an anchor in connection with magnets arranged along the outside support members at curves. Further according the invention, the ferro-magnetic members according to claim 5, can be placed in a window incorporated at the side link and held in place by means of a backing plate formed by the guide tab insert. Application of magnetic force on conveyor belts is disclosed in for example Danish patents 168.858 or 148.137, where the object is to pull the belt downwards and to retain the belt at the curve track.

It is preferable, that the window, which together with the backplate of the exchangeable insert, supports the magnetic member, is open downwards to the lower front edge of the side link to allow simple arrangement of the insert.

According to the invention, the guide tab insert is moulded from composite material, including elements, which contribute to increase resistance to wear and to reduce friction between the guide tabs and the supporting members.

According to a preferred embodiment according to the invention the guide tab insert matches exactly into the profiled cavity, extending upwards from the lower rear side of the side link extension.

According to Danish patent nr. 162.348, rod supporting tabs can be arranged at the links at both first and second row of eyeparts in order to reduce rod bending. The rod supporting tabs at the second row of eyeparts interact with the alignment tabs at the first row of eyeparts. In praxis, however, this results in, that the rod supporting tabs at the second row of eyeparts at certain conditions, when the belt is stretched completely after curve passage, has tendency to interfere with the edges of the slots at, neighbouring links. The consequence was, that the belt became rigid, and that the belt could not be stretched to the correct pitch, and therefore was unable to negotiate the sprockets. This seriously disturbed the operation of the conveyor where it is turned upside down at the return part.

Another object of the invention has been to suggest a design, where the above problems can be eliminated.

This is, according to the invention, achieved by the design of a sideflexing conveyor belt, where the links extend sidewards in a zig-zag pattern, and where the belt incorporates a first row of eyeparts, a second row of eyeparts and connection parts, which at an angle relative to the conveying direction tie the eyeparts at the first row to the eyeparts at the second row, and where the eyeparts at each row have been arranged at a distance between each other, which is slightly wider than the width of an eyepart at the second row, and where the eyeparts at the first row have crosswise aligning holes for insert of the connection rods, and where the eyeparts at the second row have crosswise aligning slots, extending towards the eyeparts at first row, and where the slots are adapted to allow movement of the connection rods extending from the neighbouring links, and where the eyeparts at the first row are provided with tabs for sidewards alignment of eyeparts at the neighbouring links, and where the eyeparts at the first row are provided with rod-supporting tabs, extending perpendicularly sidewards from the eyeparts at the first row, which links are characterized by that only the eyeparts of the first rows have been provided with alignment and rod-supporting tabs, and that the rod-supporting tabs extend into the slots at the neighbouring links.

At the design, and according to the invention, the alignment and rod-supporting tabs according to Danish patent 162.348, at the second row of eyeparts have been eliminated, instead of which the rod-supporting tabs at the first row of eyeparts have been extended in order to properly support and to prevent bending of the connection rods.

According to the invention, it is preferred, that the alignment tabs have a border contact face, which is parallel to the border face of the neighbouring connection part, by which measure the link has a high degree of freedom of movement, when the links are collapsed during curve passage.

In order to eliminate sharp edges and to prevent the neighbouring links to get caught, when passing a curve, it is preferred, that the alignment tabs extend from the hole at first rows eyepart to the edge of the slot.

As the rod-supporting tabs, even when the belt is fully stretched, extend into the slots at the neighbouring links, it is necessary to modify the outside region of the rod-supporting tab, which extends into the slot of the neighbouring link, in order to allow the belt to engage the sprockets properly and to guide the belt into the return track.

In order to avoid to weaken the connection parts near the second rows eyeparts, it is preferred, that the modified region of the rod-supporting tabs supports the connection rod at least over a contact angle, which is 180° minus the angle caused by the modification of the rod-supporting tab. As the force, which is active at the section of the rod-supporting tab extending into the slot at the neighbouring link is relatively small, the reduction caused by the above modification of the rod-supporting tab, is of minor importance.

The invention is explained more detailed in the following description with reference to the drawings, in which:

FIG. 1 is a view from the side of the conveyor.

FIG. 2 shows a cross section of the conveyor according to FIG. 1 and along the line II—II.

FIG. 5 shows a plane view of the centre link.

FIG. 6 shows the centre link viewed from the side.

FIG. 7a, 7b and 7c shows cross sections perpendicular to the top surface of the belt.

FIG. 8 shows a section of the side link, viewed from the rear side, and with a small section removed to indicate the position of the magnetic member.

FIG. 9a, 9b and 9c show the arrangement of the magnetic field, intended to reduce the load exposed to the L-shaped guide tabs during curve passage, and where FIG. 9a indicates the position of the curve bars, and where FIG. 8b shows a cross section of the magnetic system, and where FIG. 9c shows a perspective view of a section of the magnetic field.

FIG. 13 shows in three pictures the construction of a supporting tab.

Figure 3:
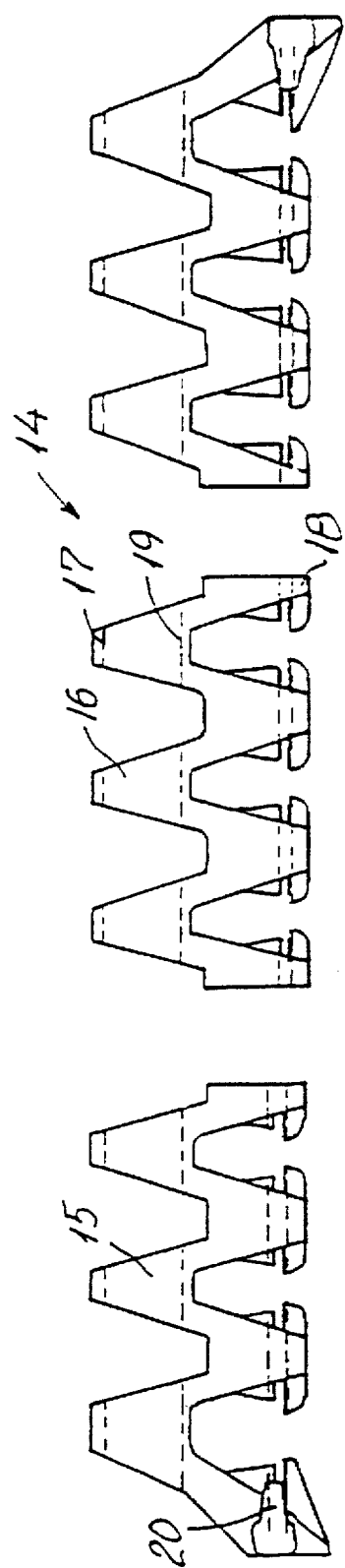
FIG. 3 shows the rear side of two side links and a centre link.
Figure 4:
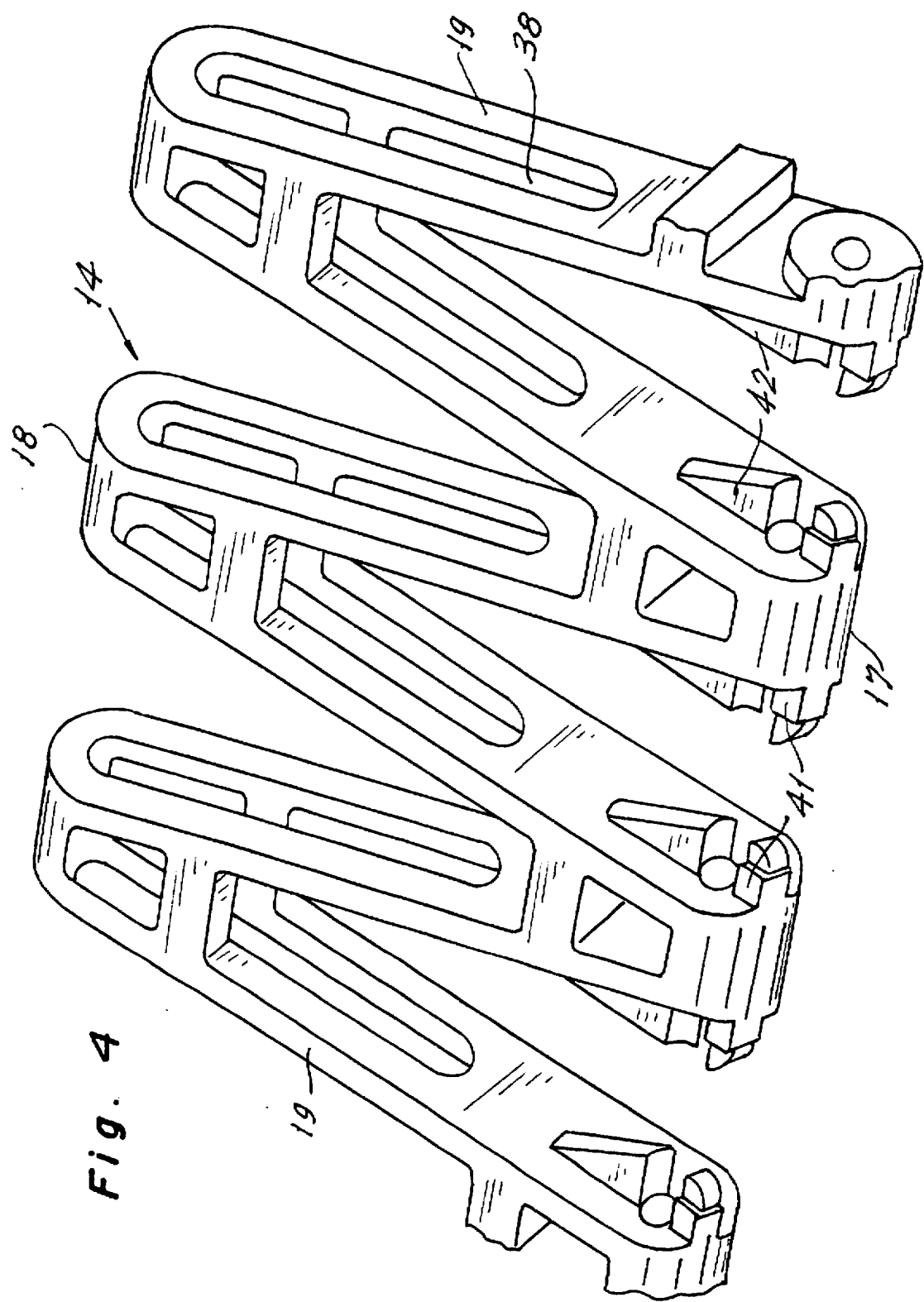
FIG. 4 shows a centre link in perspective, according to the invention.

FIG. 1 shows a conveyor 1 provided with an endless conveyor belt 2, engaging two sprockets 3a and 3b, of which 3a is indicated in full, and where 3b is indicated in dotted line. The sprockets have been mounted on separate shafts 4a and 4b, where the arrangement is intended to negotiate and pull the conveyor belt 2 by means of a drive unit (Not shown).

The upper part of the belt 2 is sliding on a support track 7 comprising slide bars extruded from polymer materials with low coefficient of friction against the belt material. The side links at the conveyor belt 2 are provided with L-shaped guide/lock tabs 9 including a vertical guide parts 10 and horizontal guide parts 11. The vertical and the horizontal guide parts 10 and 11 engage the guide rails 12 at the conveyor track, whereby the guide tabs are able to retain the conveyor belt in horizontal as well vertical direction. The guide rails 12 serve in addition to carry the conveyor belt 2 at the return track, where it is suspended underneath the conveyor track and hanging in the guide tabs 11.

The conveyor belt 2 is assembled from a number of link sections 14 of the types as shown in FIGS. 3–6. The links are moulded from a suitable plastic material, preferable POM. The link sections 14 are assembled from two side links and a number of centre links 16, depending on the width of the belt. The side link 15 and the centre link 16 incorporate a number of V-shaped sections arranged sidewards to form a zig-zag pattern extending crosswise of the belt. Each link section 14 includes a first row of eyeparts 17 and a second row of eyeparts 18, where the eyeparts 17 and 18 are tied together by means of connection parts 19, which connect the eyeparts at first row with eyeparts at second row at an angle relative to the conveying direction. The eyeparts 17 and 18 in each row are arranged at a distance between each other, which is somewhat wider, than the width of an eyepart at second row. The eyeparts 17 and 18 have been provided with crosswise aligning holes 34 and slots 38, through which the connection rods 23 can be inserted, and by means of which rods the link sections 14 can be assembled to form a belt. The holes at the eyeparts at second row have been extended to form slots 38, by means of which the connection rods can slide lengthwise inside the connection part 19, and which allow the link sections 14 to collapse, which makes it possible for the belt to pass through a curve section at the conveyor.

The side links 15 have, as goes forward from FIG. 3, been provided with L-shaped guide/lock tabs 20, where the tabs 10 and 11 serve to retain the belt 2 in correct position relative to the side frames 13 at the conveyor and the guide rails 12 during straight runs as well as during curve passages. The guide tabs 10 are, due to the occurrence of extreme high friction, particularly at curves, exposed to extensive wear, and particularly at conveyors, where several curves have to be passed. The wear, as it occurs at the guide tabs, is considerably higher, than the wear occurring at other parts of the belt or at the guide rails. According to the invention, the horizontal and the vertical guide tabs have been incorporated in an exchangeable insert, which during the service life of the conveyor belt can be changed and replaced one or several times. The invention also suggest the possibility in a simple manner to incorporate a magnetic conductive members at the side link, by means of which the belt can interact with a magnetic field arranged at the outside curve track, and by mans of which the belt can be pulled radially outwards with the specific purpose to reduce the friction and the wear at the guide rail 12 and the guide tabs 9.

According to the invention, a cavity has been incorporated in the downards extension of the side link, into which a guide/lock insert can be fixed. FIG. 7a shows a cross section of the side link, where the cavity 21 has a rectangular cross section, stretching from the bottom of the side link 22 to a level just above the connection rod 23. The guide/lock insert incorporates a double snap-fit lock system, intended to tie the insert to the side link and to the connection rod. The insert incorporates a male lock section 30 and a female lock part 24, which engage a corresponding female lock part 33 at the side link and a circular keyway 26 at the end of the connection rod. The flights at the female part of the snap-fit lock have cuts 27 to allow the plastic material to flex slightly during assembly or disassembly of the insert. In the same manner the male part 32 incorporated in the lock part 30 has been provided with a cut to allow the male part 32 to flex slightly to allow assembly or disassembly of the insert. Further, the insert incorporates a rectangular stop plate 25 intended to prevent dirt and liquids to penetrate into the cavity through the assembly hole for the connecting rod. The rectangular stop plate also serves as back-stop for the ferro-magnetic body 29 fixed between the window 28 and the stop 25. In order to provide guidance for the connection rod 23 and at the same time to retain the connection rod in correct position and to support the end section of the connection rod, the male part of the snap fit lock 30 has been provided with an alignment hole 31, through which the connection rod is inserted, as indicated at FIG. 5b. It is important, that the guide/lock insert fits exactly into and covers the downwards opening of the cavity in order to prevent penetration into and accumulation of liquids or dirt at the cavity.

The ferro-magnetic body 29 has been provided with a trapeze-shaped cross section profile in order to retain the insert and the magnetic body in correct position at the window incorporated at the side link. FIG. 8 shows details of the arrangement, where a section of the vertical guide tab 11 has been removed to show the extension and the arrangement of the magnetic body. The outward face of the magnetic body aligns or extends slightly beyond the wall of the downward extension (31) at the side link, the purpose being to allow the ferro-magnetic member to interact with a magnetic field incorporated in the outside curve track of the conveyor.

Figure 9A:
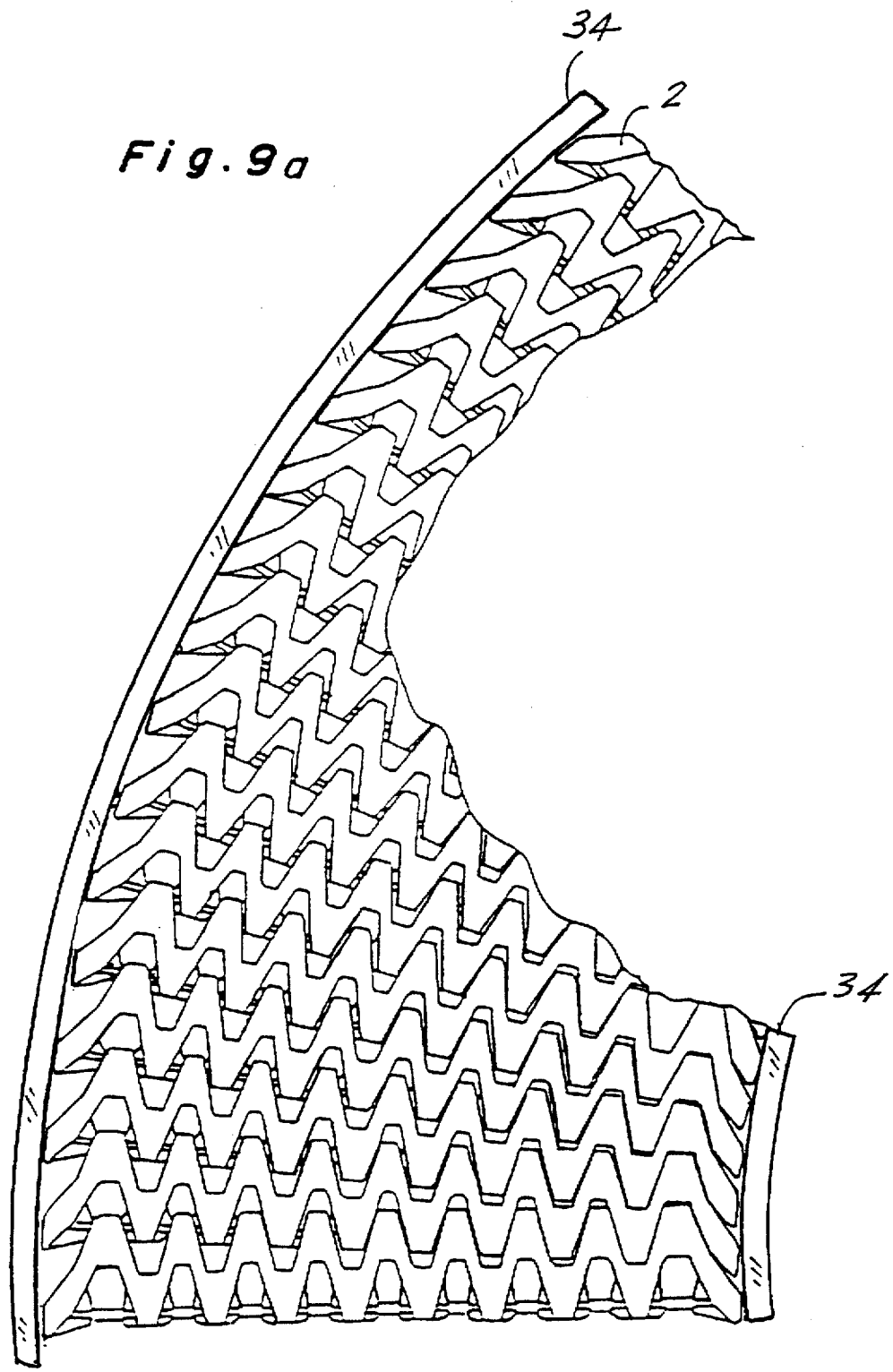

Details of the magnetic field has been shown in FIGS. 9a, 9b and 9c. As indicated on FIG. 9a, the magnetic field is protected by covers 34, which also protect the walls of the conveyor track. The magnetic field incorporated at the curves is, according to a preferred design assembled as shown in FIGS. 9b and 9c. The design includes two curve bars (35 and 36 made from magnetic conductive material, preferably mild steel, and which are connected by strong permanent magnets 37. The design creates a homogenous magnetic field, extending in the full length of the curve bars, and by means of which any tendency for the conveyor belt to pulsate is eliminated. The magnets 37 connecting the two curve bars 35 and 36 and the ferro-magnetic members 29 establish together a closed magnetic circuit, including narrow slots 38 and 39, as shown on FIG. 9b, where a cross section of the side link and the structure supporting the conveyor has been shown.

The slots 38 and 39 must be held at a minimum width, in order to prevent excessive loss of the magnetic effect, and should be less than 1 mm. For this reason the magnetic field should have some adjustability to allow adjustment for possible wear of the guide tab 11.

Figure 10B:
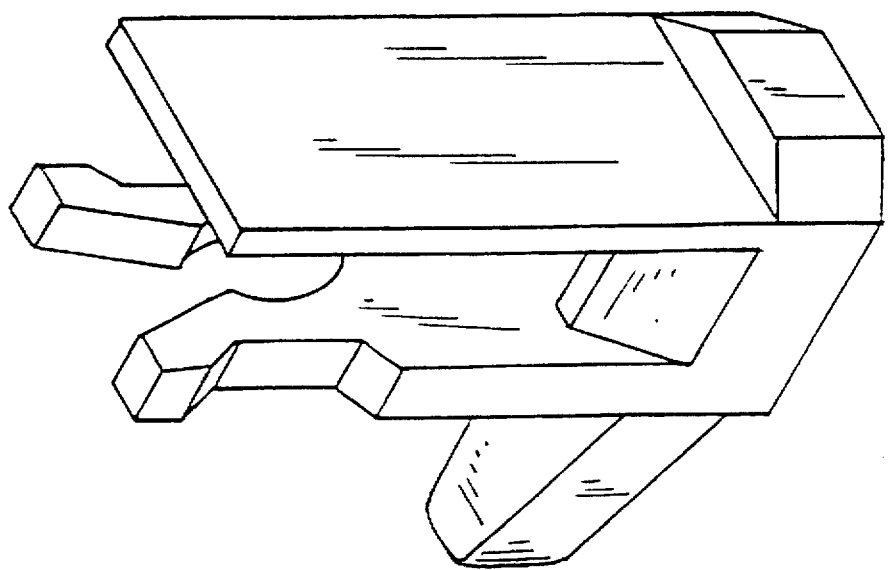
FIG. 10a and 10b shows perspective views of the guide/lock insert, according to the invention.
Figure 10A:
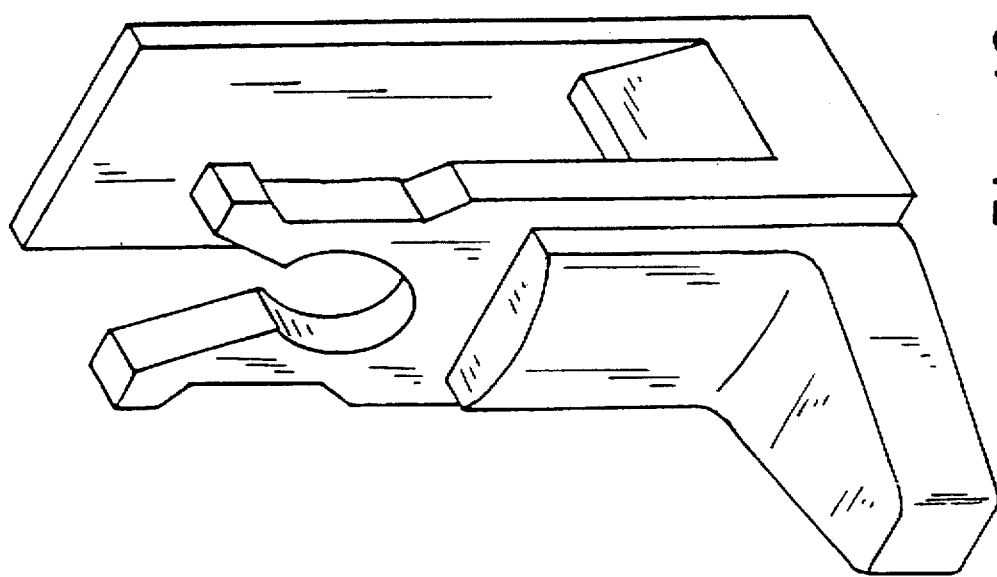

Details of the guide/lock tab insert are shown in FIGS. 10a and 10b, indicating a preferred design in perspective. In order to reduce friction and wear, the insert should preferably be moulded from special composite to improve the tribological qualities. The composition of a suitable material includes the following components:

| |
|---|
| 5–25% by weight PTFE |
| 30–60% by weight Polyamide 6-6 |
| 5–30% by weight Spheric glass bodies |
| 5–20% by weight Glass-, carbon- or aramid fibres. |
| 2–5% by weight Molybdene-disulphide |
| 1–5% by weight CuO |
| 1–5% by weight $Pb_3O_4$ |

As to the size of the ferro-magnetic members it is preferred, that they each have a face area towards the magnetic field of 150 $mm^2$. The arrangement of the magnetic field at the curves, according to the invention, allows a significant reduction of the friction and the wear, occurring at the contact between the guide rail and the guide/lock tabs. Measurements have indicated, that a reduction up to 30% of friction and wear can be achieved by incorporation of permanent magnets, each with a field strength of 180N, at a conveying speed of 48 meters per minute, and the total load being 1500N/$m^2$. The effect increases with increase of the magnetic field strength, but also with increasing load and conveying velocity.

Figure 11:
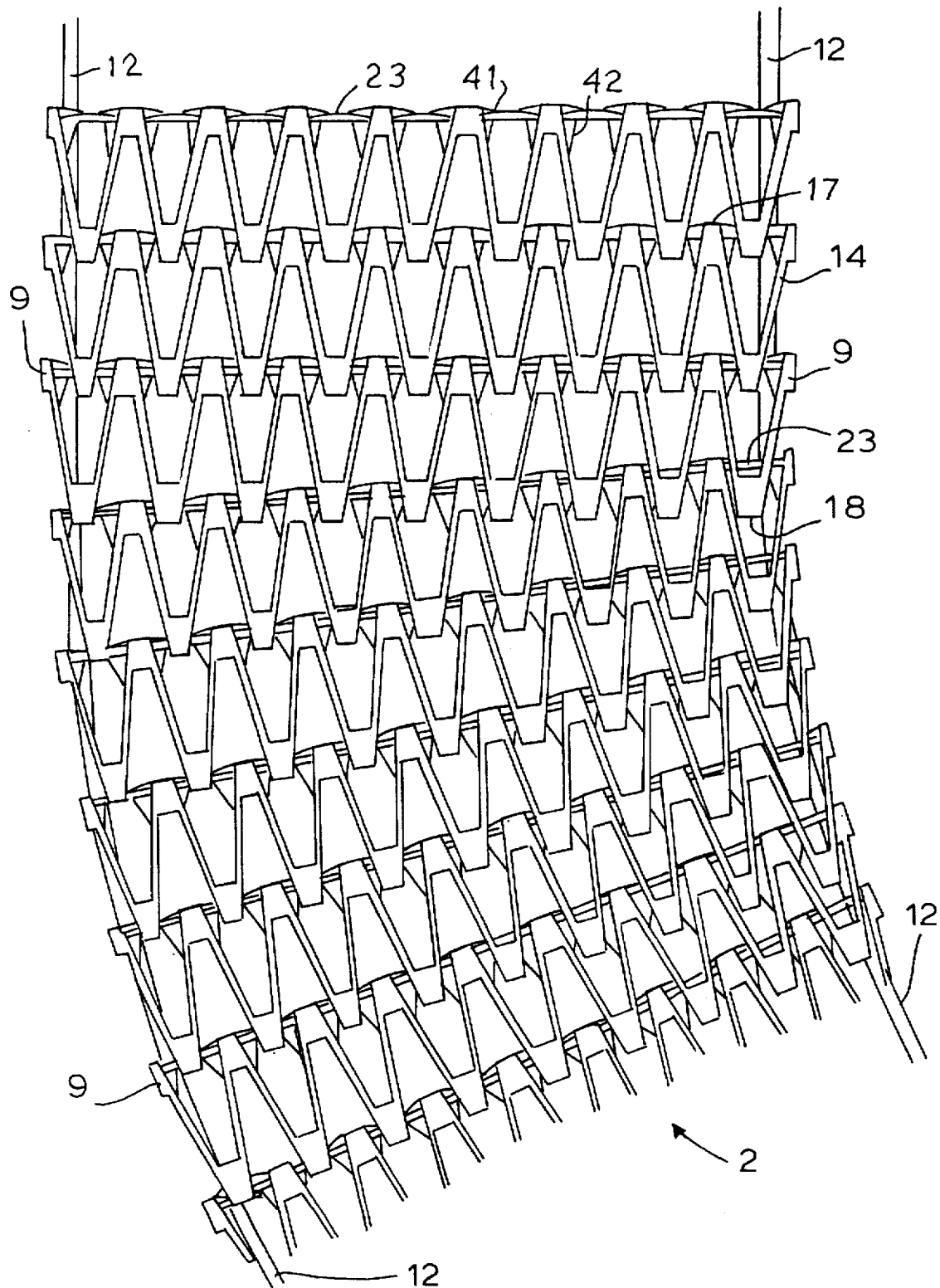
FIG. 11 shows a section of a side-flexing conveyor belt, according to the invention, where the belt is coming from a straight run at top and proceeding into a curve section.
Figure 12:
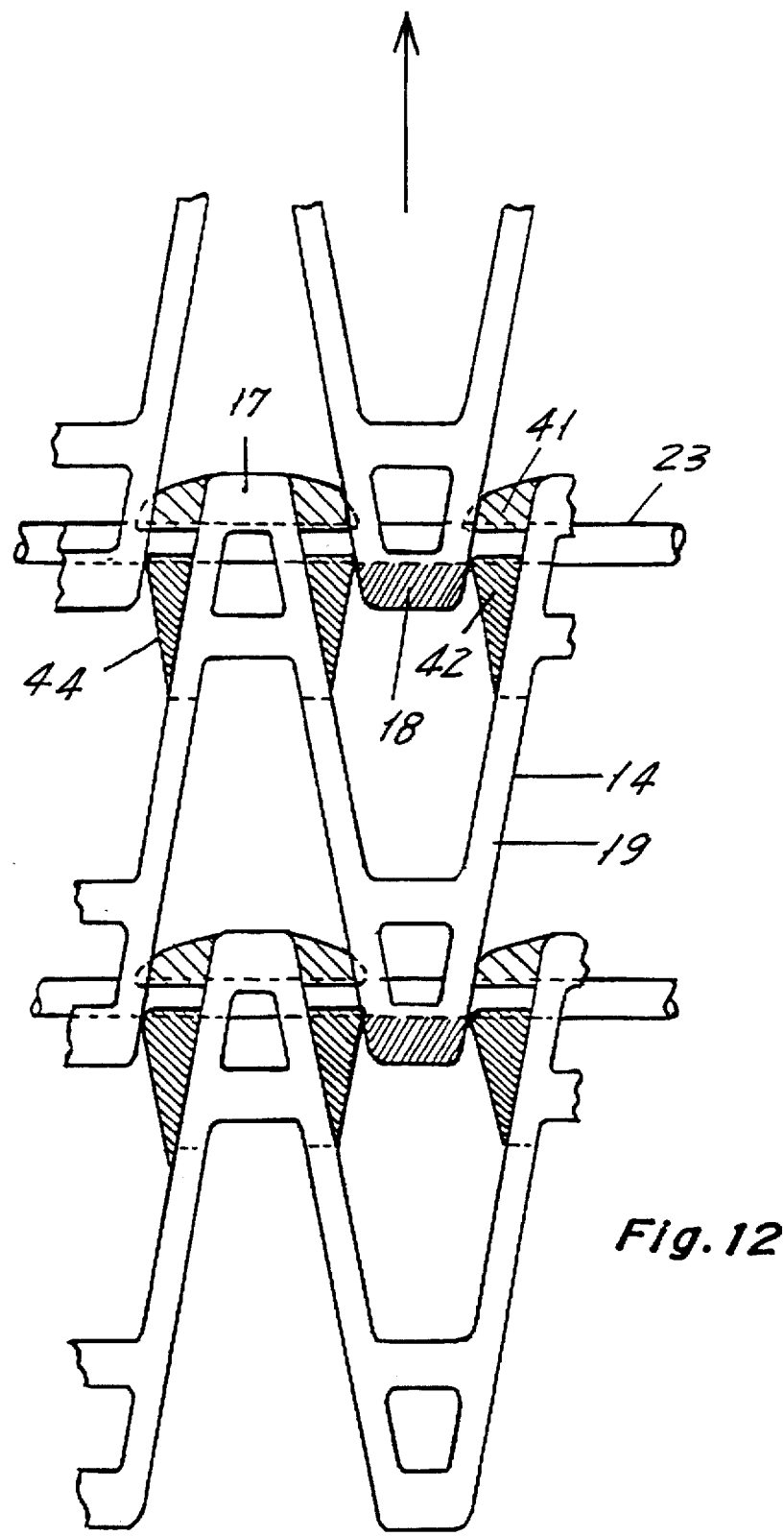
FIG. 12 shows, in large scale, a straight section of the sideflexing belt, according to the invention.

FIG. 11 indicates a section of a conveyor belt 2 guided at each sides by guide rails 12. The conveyor belt is assembled from a number of link sections 14 connected by rods 23, which are inserted through holes at the eyeparts 17 and 18. The conveyor belt negotiates a straight run, shown at the top, and proceeds into a curve, which is possible, as the links gradually collapse at increasing rate the closer the links are placed to the inside section of the belt. The connection rods move during this process in the slots, unable to carry any load, which implies, that the entire load has to be carried by the links and rods placed at the very outside section of the belt during curve passage. In other words, the majority of the belt pull is transferred from links at the outside section of the belt from eyeparts (18) at the second row through the connection part 19 and through the connection rod 23 to the eyepart 17 at the first row. From the FIG. 11 it is seen that the width of the eyeparts must be slightly less than the distance between the eyeparts at the neighbouring link in order to allow sufficient agility of the links during curve passage. Further, it is necessary, that the eyeparts are properly aligned, when the belt is running straight after curve passage, and to secure that the connection rods are arranged perpendicularly relative to the conveying direction. In order to align the eyeparts at the space between the neighbouring eyeparts, the eyeparts at the first row 17 are provided with alignment tabs 42, which interact with the eyepart at the second row 18, as shown in FIG. 12. The alignment tabs 42 are indicated on FIGS. 4, 5, 6 and 12. The distance between the alignment tabs 42 at neighbouring eyeparts correspond to the width, or is slightly more than the width of the neighbouring eyepart. Alignment tabs are fixed only at the eyeparts (17) at the first row. The alignment tabs extend from the edge of the hole 34 for the connection rod 23 to the forward edge of the slot 38, as shown on FIG. 5. The front side of the tab 44, shown on FIG. 12, follows essentially a line parallel with the side of the neighbouring connecting part 19.

When it, in order to achieve high side-flexibility of the belt, is necessary to incorporate a rather wide space between the eyeparts at two on each other following links eyeparts and mounted on the same connection rod, and where the connection rod has to transfer high tensile force, then the connection rod will be exposed to large bending force and replacement forces. Particularly the bending force can be a problem, in the event that the connection rod, as often is preferable, is manufactured from plastic material, which easily deforms and in additional has poor mechanical strength.

To compensate for this, and according to the invention, rod-supporting tabs 41 have been arranged at the first row of eyeparts. Such rod-supporting tabs 41 have been indicated on FIGS. 4, 5, 6 and 12. In order to minimize bending of the connecting rods 23 these tabs are designed with a length, where they align with the edge of the slot at eyepart 18. In theory the risk for rod-bending is eliminated by this, in practise, however, the risk for bending of the rod is reduced considerably, only, due to the fact, that the material, from which the supporting tabs have been moulded from, has some elasticity and therefore a tendency to distort, when exposed to high tensile force. Accordingly, it is practical, that the rod-supporting tab has an extension, which allows support of the connection rod over an extended length, increasing the width between the eyeparts at second rows eyeparts, and where the supporting tabs thereby extend into the slots of the neighbouring eyeparts. A fraction of the tensile force is thereby transferred from one link to the neighbouring in the shape of a pressure force acting crosswise through the connection rod 23, which, relative to the load on the connecting rod, is a big advantage, particularly when the rods are made from a plastic material.

As the rod-supporting tabs 41 continuously extend into the slots 38, they have been designed to allow rotation of the links relative to the connection rods, when the belt is fully stretched, and when the belt has to mesh with the sprockets 3a and 3b. Details of the rod-supporting tab 41 are shown at FIGS. 13a, 13b and 13c. The rod-supporting tab 41 incorporates a rounded front edge 46, facilitating the insert into the slot at the neighbouring link during assembly of the belt. In addition, and as goes forward from FIG. 13b, the extreme outside region 47 has been reduced in size, and tapered at the transition area to allow the rotating as needed. The counterface 49 supporting the connection rod has been designed to align with the hole 34 at eyepart 17.

Figure 14:
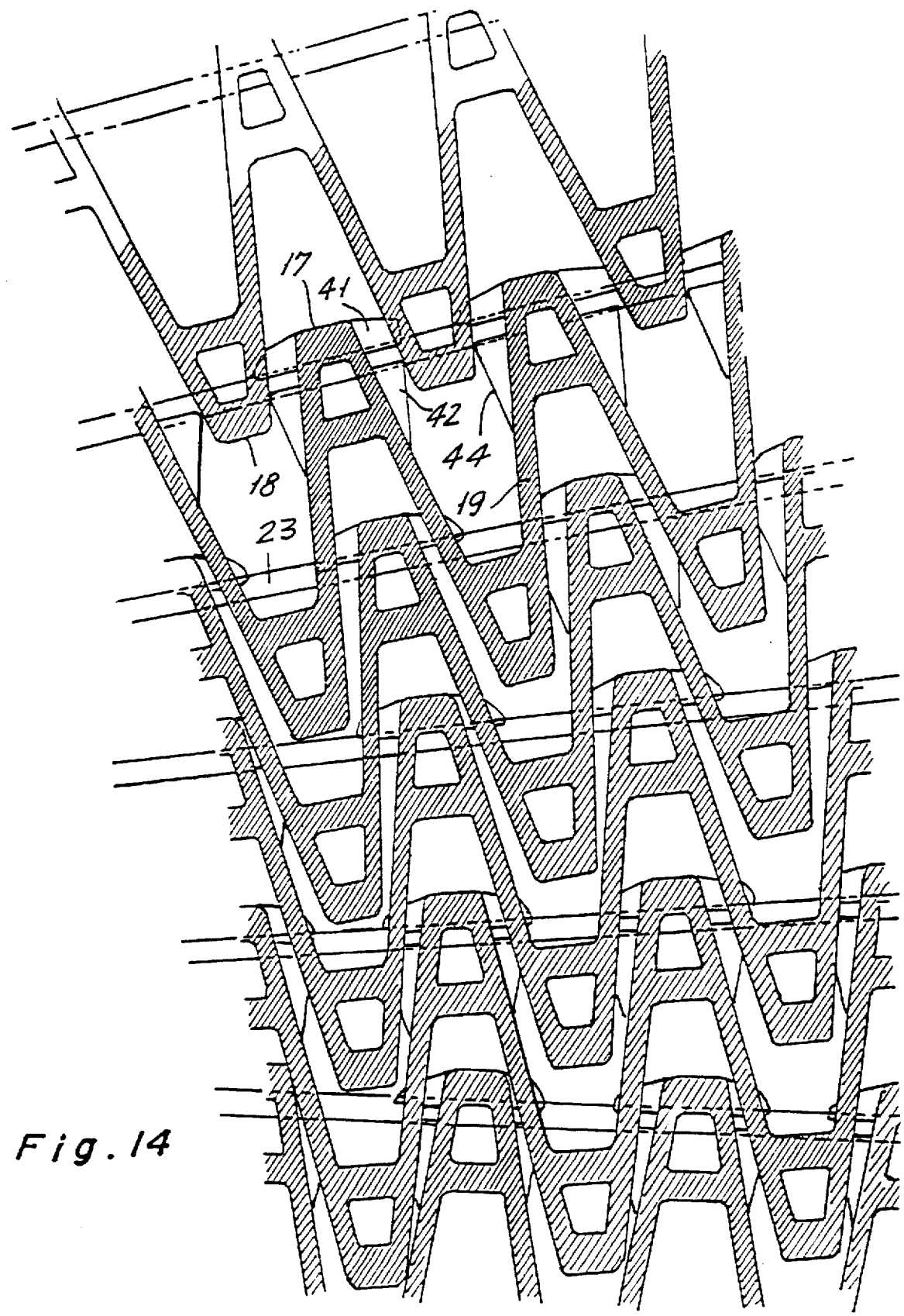
FIG. 14 shows a section of the side-flexing belt, according to the invention, during curve passage.

FIG. 14 shows a section of a conveyor belt, according to the invention, passing through a curve. It is seen that the rod-supporting tabs 41 continuously extend into the slots 38 during the curve passage, and further, that they are able to move freely in the slots 38. Accordingly, the conveyor belt is able to stretch to full pitch after curve passage, without any interference from rod-supporting tabs.

I claim:

1. A side-flexing conveyor belt, comprising a load carrying top surface, which is assembled from links extending sidewards across the width of the belt, including eyeparts and connection parts, where the eyeparts at the first row are provided with alignment tabs and rod-supporting tabs, and with where the eyeparts at the first row have sidewards aligning holes for insert of connection rods, and where the eyeparts at the second row of eyeparts are provided with sidwards aligning slots, in which the connection rods can move freely inside the connection parts in the direction of first rows eyeparts, and where the side links are provided with L-shaped guide tabs, designed to guide the side-flexing conveyor belt in horizontal as well as in vertical direction, and by means of which the conveyor belt can be retained in the supporting members, characterized in that the side links have downwards extensions, perpendicular to the load carrying top surface of the conveyor belt, and which incorporate cavities, through which the connection rods can be inserted, and into which guide/lock inserts, incorporating snap-fit parts to engage with the corresponding connection rods.

2. A conveyor belt according to claim 1, characterized in that the guide/lock insert is adapted to engage a circular keyway at the end of the connection rod by means of a snap-fit lock.

3. A conveyor belt according to claim 1, characterized in that the connection rods are provided with circular keyways at both ends.

4. A conveyor belt according to claim 1, characterized in that the connection rods are inserted through holes incorporated in the male snap-fit part at the side link, and which male part engages a female snap-fit lock part incorporated in the guide/lock insert.

5. A conveyor belt according to claim 1, characterized in that the cavity at the side link extension incorporates a window, provided with profiled side walls, and where the window provides space for a ferro-magnetic member.

6. A conveyor belt according to claim 5, characterized in that the frame of the window is open downwards, away from the load carrying top surface of the conveyor belt.

7. A conveyor belt according to claim 1, characterized in that the guide/lock insert is moulded from a composite material, which contributes to increase the resistance to wear and to reduce friction.

8. A conveyor belt according to claim 1, characterized in that the guide/lock insert completely occupy the cavity at the side link extension and closes the lower opening of the cavity.

9. A conveyor belt incorporating links, which in zig-zag pattern extend sidewards across the width of the belt, and which includes a first row of eyeparts (17), a second row of eyeparts (18) and connection parts (19), which at an angle to the length direction of the belt tie the eyeparts (17) of the first row to the eyeparts (18) of the second row of eyeparts, and where the eyeparts at each row are placed at a distance between each other, which is wider than the width of an eyepart at the second row, and where the eyeparts (17) of the first row have been provided with holes in crosswise alignment for the connection rod (38), and where the eyeparts at the second row have been provided with crosswise aligning slots, which extend into the connection parts, intended to allow movement of the connection rods extending from neighbouring links, and where the eyeparts at the first row are provided with tabs (41,42) for alignment of the eyeparts at the neighbouring links, and for support of the connections rods, characterized in that only the eyeparts (17) of the first rows have been provided with alignment and rod-supporting tabs (41,42), and that the rod-supporting tabs (41) extend into the slots at the neighbouring links.

10. A conveyor belt according to claim 9, characterized in that the alignment tabs have front sides (44), which approximately are parallel to the front side of the neighbouring connection parts (19).

11. A conveyor belt according to claim 9, characterized in that the alignment tabs (42) extend from the edge of the hole of first row of eyeparts (17) to the edge of the slots (38) at the connection part.

12. A conveyor belt according to claim 9, characterized in that the rod-supporting tabs (41) have been rounded at the front edges, and have been reduced in size at the region, which extend into the slots (38) at the neighbouring connection parts.

13. A conveyor belt according to claim 12, characterized in that the reduced region of the rod-supporting tab (41) has a counterface angle, which is maximum 180° minus the sharpening angle at the end of the rod-supporting tab.

* * * * *